United States Patent
Ajichi et al.

(10) Patent No.: US 10,315,928 B2
(45) Date of Patent: Jun. 11, 2019

(54) METHOD FOR PRODUCING BARIUM TITANATE-BASED POWDER, AND MULTILAYER CERAMIC CAPACITOR

(71) Applicant: Murata Manufacturing Co., Ltd., Nagaokakyo-shi, Kyoto-fu (JP)

(72) Inventors: Hiroko Ajichi, Nagaokakyo (JP); Toshiharu Nakagawa, Nagaokakyo (JP); Wenjun Wang, Nagaokakyo (JP); Sanae Nakae, Nagaokakyo (JP); Norikazu Tachibana, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 781 days.

(21) Appl. No.: 14/934,420

(22) Filed: Nov. 6, 2015

(65) Prior Publication Data
US 2016/0137523 A1   May 19, 2016

(30) Foreign Application Priority Data
Nov. 17, 2014  (JP) .................. 2014-233067

(51) Int. Cl.
*C01G 23/00* (2006.01)
*H01G 4/12* (2006.01)
(Continued)

(52) U.S. Cl.
CPC ........ *C01G 23/006* (2013.01); *C04B 35/4682* (2013.01); *C04B 35/62655* (2013.01);
(Continued)

(58) Field of Classification Search
CPC .... C04B 2235/3206; C04B 2235/3215; C04B 2235/3224; C04B 2235/3232; C04B 2235/3262; C04B 2235/3418; C04B 2235/5409; C04B 2235/6581; C04B 2235/6582; C04B 2235/6588; C04B 35/4682; C04B 35/62655;
(Continued)

(56) References Cited

U.S. PATENT DOCUMENTS

2009/0202426 A1*  8/2009  Yamashita ............. B82Y 30/00
                                                    423/598

FOREIGN PATENT DOCUMENTS

CN       1774399 A      5/2006
CN     103796956 A      5/2014
(Continued)

OTHER PUBLICATIONS

NPL: "Hydrothermal synthesis of barium titanate", Ind. Eng. Chem. Res. 2003, pp. 473-483, vol. 42.*
JP10-330158, Saito et al, machine translation, 1998.*

*Primary Examiner* — Melvin C. Mayes
*Assistant Examiner* — Smita S Patel
(74) *Attorney, Agent, or Firm* — Arent Fox LLP (57) ABSTRACT

A method for producing a barium titanate-based powder that includes mixing a titanium compound and a barium compound together with water and chlorine to prepare a slurry, and temporarily firing the mixture of the titanium compound and the barium compound which is contained in the slurry to provide a barium titanate-based powder. The chlorine in the slurry is in the form of chlorine ions in a ratio of 230 to 1100 wt ppm based on the amount of the barium titanate-based powder to be synthesized.

13 Claims, 2 Drawing Sheets (51) Int. Cl.
*H01G 4/30* (2006.01)
*C04B 35/468* (2006.01)
*C04B 35/626* (2006.01)

(52) U.S. Cl.
CPC ..... *C04B 35/62675* (2013.01); *H01G 4/1227* (2013.01); *H01G 4/30* (2013.01); *C01P 2002/74* (2013.01); *C01P 2006/12* (2013.01); *C01P 2006/80* (2013.01); *C04B 2235/3206* (2013.01); *C04B 2235/3215* (2013.01); *C04B 2235/3224* (2013.01); *C04B 2235/3232* (2013.01); *C04B 2235/3262* (2013.01); *C04B 2235/3418* (2013.01); *C04B 2235/5409* (2013.01); *C04B 2235/6581* (2013.01); *C04B 2235/6582* (2013.01); *C04B 2235/6588* (2013.01); *C04B 2235/72* (2013.01)

(58) Field of Classification Search
CPC ............ C04B 35/62675; C01G 23/006; C01G 23/00; H01G 4/1227; H01G 4/30; H01G 4/12; C01P 2006/80; C01P 2006/12
See application file for complete search history.

(56) References Cited

FOREIGN PATENT DOCUMENTS

| | | |
|---|---|---|
| JP | 2005-162594 A | 6/2005 |
| JP | 2005-330112 A | 12/2005 |
| JP | 2006-089368 A | 4/2006 |
| JP | 2006-199578 A | 8/2006 |
| JP | 2009-190912 A | 8/2009 |
| JP | 2009-298658 A | 12/2009 |

\* cited by examiner

METHOD FOR PRODUCING BARIUM TITANATE-BASED POWDER, AND MULTILAYER CERAMIC CAPACITOR

BACKGROUND OF THE INVENTION

Field of the Invention

The present invention relates to a method for producing a barium titanate-based powder, and a multilayer ceramic capacitor.

Description of the Related Art

In a multilayer ceramic capacitor, an external electrode is formed at each of both end surfaces of a ceramic sintered body obtained by alternately laminating dielectric ceramic layers and internal electrode layers, and performing a firing treatment.

Since such a structure ensures that a large capacitance can be achieved while the size is kept small, multilayer ceramic capacitors are widely used with an increase in demand for mobile devices, etc., in recent years.

Multilayer ceramic capacitors are required to have a further reduced size and increased capacitance. For satisfying these requirements, thinning of the dielectric ceramic layers that form multilayer ceramic capacitors is promoted, but when dielectric ceramic layers are thinned, an electric field intensity applied per layer becomes relatively high. Accordingly, the reliability of the multilayer ceramic capacitor is easily deteriorated due to a small variation in grain size and reduction of crystallinity of ceramic grains that form the dielectric ceramic layer. Thus, it is required to improve reliability during application of a voltage, particularly life characteristics in a high temperature load test, by accurately controlling the grain size and crystallinity of ceramic grains that form the dielectric ceramic layer.

Japanese Patent Laid-open Publication No. 2009-190912 describes a method in which a titanium dioxide powder having a surface chlorine content and internal chlorine content of 2000 ppm or less in total, a surface chlorine content of 120 ppm or less, a rutile content of 30% or less and a BET specific surface area of 30 m²/g or more is provided, and a titanium dioxide powder is used to produce a barium titanate-based powder.

According to Japanese Patent Laid-open Publication No. 2009-190912, grain growth during production of barium titanate is suppressed, so that a barium titanate-based powder which is fine and has uniform grain properties and high tetragonality is obtained.

Japanese Patent Laid-open Publication No. 2009-190912 indicates that grain growth of titanium dioxide and barium titanate by residual chlorine is induced principally by surface chlorine of titanium dioxide grains. Specifically, chlorine ions (Cl groups) as an impurity are bound to the surfaces of titanium dioxide grains, and during production of barium titanate, uniformly distributed titanium dioxide grains are bound together with the surface chlorine serving as a core, so that abnormal growth is induced.

By adjusting the surface chlorine content of the titanium dioxide powder to 120 ppm or less Japanese Patent Laid-open Publication No. 2009-190912, abnormal growth is alleged to be suppressed.

Here, during production of a barium titanate-based powder, a step of adding water to a barium compound and a titanium compound to prepare a slurry, and performing wet-mixing is often employed.

Normally, $BaCO_3$ is used as a barium compound, and $TiO_2$ is used as a titanium compound.

The present inventors have found that the following event occurs in a process for production of a barium titanate-based powder, which includes a wet-mixing step.

When a slurry is prepared, a very small amount of $BaCO_3$ as the barium compound is dissolved in water to generate $Ba^{2+}$ ions. When $Ba^{2+}$ ions exist in the slurry, at the time of drying the slurry, the $Ba^{2+}$ ions react with $CO_2$ in the air to be reprecipitated in the dry powder as $BaCO_3$. The reprecipitated $BaCO_3$ causes abnormal growth with itself serving as a core to increase variations in grain size, and also reduces the crystallinity of barium titanate.

That is, the present inventors have found that reprecipitation of $BaCO_3$ leads to variations in grain size of the barium titanate-based powder and reduction of crystallinity of barium titanate, and hence deterioration of reliability as a multilayer ceramic capacitor.

It is believed that the invention described in Japanese Patent Laid-open Publication No. 2009-190912 is not effective against abnormal growth and reduction of crystallinity due to the above-mentioned mechanism.

In the invention described in Japanese Patent Laid-open Publication No. 2009-190912, reliability as a multilayer ceramic capacitor may be deteriorated because chlorine ultimately remains in a temporarily fired raw material.

The present invention has been devised for solving the problems described above, and an object of the present invention is to provide a method for producing a barium titanate-based powder while preventing reprecipitation of $BaCO_3$ so as to suppress variations in grain size of the barium titanate-based powder and reduction of the crystallinity of barium titanate, so that a high-reliability multilayer ceramic capacitor can be produced.

SUMMARY OF THE INVENTION

The method for producing a barium titanate-based powder according to an aspect of the present invention for achieving the above-mentioned object includes: mixing a titanium compound and a barium compound together with water to prepare a slurry; and a temporarily firing the mixture of the titanium compound and the barium compound which is contained in the slurry to provide a barium titanate-based powder. The slurry contains chlorine as chlorine ions in a ratio of 230 to 1100 wt ppm based on the amount of the barium titanate-based powder to be synthesized.

In the method for producing a barium titanate-based powder according to an aspect of the present invention, the slurry contains chlorine ions in a predetermined amount (230 to 1100 wt ppm based on the amount of the barium titanate-based powder to be synthesized).

It is believed that when a slurry containing a barium compound and water is stirred, a very small amount of $Ba^{2+}$ ions are dissolved in the slurry as described above, but when the slurry contains chlorine ions, the chlorine ions react with the very small amount of dissolved $Ba^{2+}$ ions to form $BaCl_2$. The very small amount of dissolved $Ba^{2+}$ ions may react with chlorine ions to form $BaCl_2$ because the slurry contains chlorine ions in an amount sufficient to react with the very small amount of dissolved $Ba^{2+}$ ions.

Crystals are then precipitated as $BaCl_2$ in a dry powder when the slurry is dried.

$BaCl_2$ accelerates the reaction of the titanium compound and the barium compound to form barium titanate, and also acts as a sintering additive, and therefore the temporary firing temperature can be lowered, so that a fine barium titanate-based powder having increased crystallinity can be obtained.

Since it is believed that $Ba^{2+}$ ions capable of reacting with $CO_2$ in the air do not remain at the time of drying the slurry, $BaCO_3$ is not reprecipitated even when the slurry is dried, so that occurrence of abnormal growth is prevented.

In the invention described in Japanese Patent Laid-open Publication No. 2009-190912, a titanium dioxide powder having a surface chlorine content and internal chlorine content of 2000 ppm or less in total is used, and the surface chlorine content of the titanium dioxide powder is 120 ppm or less.

It is believed that since even in the form of a slurry, internal chlorine is not ionized, and only surface chlorine is ionized, the concentration of chlorine ions in the slurry is 120 ppm or less (about 40 ppm or less in terms of a concentration based on the amount of a barium titanate-based powder to be synthesized) in the invention described in Japanese Patent Laid-open Publication No. 2009-190912.

That is, in the invention described in Japanese Patent Laid-open Publication No. 2009-190912, it is believed that the concentration of chlorine ions in the slurry is excessively low, and therefore the amount of chlorine ions is insufficient at the time when a very small amount of $Ba^{2+}$ ions are dissolved, so that $Ba^{2+}$ ions remain without reacting with chlorine ions. At the time of drying the slurry, it is believed that $Ba^{2+}$ ions react with $CO_2$ in the air to be reprecipitated in the dry powder as $BaCO_3$.

In the invention described in Japanese Patent Laid-open Publication No. 2009-190912, an effect of increasing crystallinity by lowering the temporary firing temperature may not be obtained because the precipitated amount of $BaCl_2$ acting as a sintering additive is small.

In the present invention, surface chlorine exists on the surfaces of titanium dioxide grains used as the titanium compound. Thus, in the present invention, the amount of a chlorine ion source to be added may be adjusted so that the total amount of chlorine ions generated by ionization of surface chlorine of titanium dioxide grains and chlorine ions from the chlorine ion source added separately equals a predetermined amount (230 to 1100 wt ppm based on the amount of a barium titanate-based powder to be synthesized).

Preferably, the chlorine is added as ammonium chloride in the mixing step in the method for producing a barium titanate-based powder according to an aspect of the present invention.

When chlorine is added as ammonium chloride, $Ba^{2+}$ ions are bonded to chlorine ions to generate $BaCl_2$ while being inhibited from reacting with $CO_2$ to be precipitated as $BaCO_3$.

Preferably, the method for producing a barium titanate-based powder according to an aspect of the present invention further includes a chlorine removing step of reducing to 100 wt ppm or less the content of chlorine contained in or on the barium titanate-based powder by removing chlorine contained in or on the barium titanate-based powder obtained in the temporary firing step.

Preferably, the slurry in which the barium titanate-based powder obtained in the temporary firing step is dispersed is caused to pass through an ion exchange resin in the chlorine removing step.

When chlorine remains in or on the barium titanate-based powder after temporary firing, reliability as a multilayer ceramic capacitor may be deteriorated. Preferably, chlorine does not exist in or on the barium titanate-based powder after temporary firing. Therefore, by carrying out the chlorine removing step to reduce the chlorine content to 100 wt ppm or less, a barium titanate-based powder for producing a multilayer ceramic capacitor having higher reliability can be provided.

When a method including passage of the barium titanate-based powder through an ion exchange resin is used as a method for removing chlorine remaining in or on the barium titanate-based powder after temporary firing, chlorine remaining in or on the barium titanate-based powder can be selectively removed.

A multilayer ceramic capacitor according to the present invention is produced using a barium titanate-based powder obtained by the method for producing a barium titanate-based powder according to the present invention.

The barium titanate-based powder obtained by the method according to the present invention is a fine barium titanate-based powder having increased crystallinity, and therefore the multilayer ceramic capacitor produced using the barium titanate-based powder is a high-reliability multilayer ceramic capacitor excellent in life characteristics in a high temperature load test.

According to an aspect of the present invention, there can be provided a method for producing a barium titanate-based powder while preventing reprecipitation of $BaCO_3$ and precipitating $BaCl_2$ to suppress variations in grain size of the barium titanate-based powder and reduction of the crystallinity of barium titanate, so that a high-reliability multilayer ceramic capacitor can be produced.

DETAILED DESCRIPTION OF THE INVENTION

Hereinafter, a method for producing a barium titanate-based powder according to an aspect of the present invention and a multilayer ceramic capacitor according to another aspect of the present invention will be described with reference to the drawings.

However, the present invention is not limited to the following constitutions, and may be applied while a change is appropriately made as long as the gist of the present invention is not changed. The present invention also includes combinations of two or more individual preferred constitutions of the present invention as described below.

First, the method for producing a barium titanate-based powder according to the present invention will be described.

(1) Mixing Step

First, a mixing step of mixing a titanium compound and a barium compound together with water to prepare a slurry is carried out.

Titanium dioxide can be used as the titanium compound.

The titanium dioxide may be either titanium dioxide produced by a chlorine method or titanium dioxide produced by a sulfuric acid method. When titanium oxide produced by a chlorine method is used, surface chlorine may exist on the surfaces of titanium dioxide grains, and therefore it is preferable that the surface chlorine content is measured, and the amount of a chlorine ion source to be added later is adjusted.

The surface chlorine content can be measured in the following manner: a titanium dioxide powder is put in pure water, the mixture is stirred, ultrasonically dispersed, and then centrifugally separated to collect a supernatant liquid, and the supernatant liquid is diluted, and then filtered with a 0.2 μm filter, and quantitative determination is performed by ion chromatography.

The total chlorine content: a surface chlorine content and an internal chlorine content of titanium dioxide grains can be measured in the following manner: 1000 mg of a sample is distilled with water vapor at 1400° C., a decomposed product is collected in 50 ml of ultrapure water, and quantitative determination is performed by ion chromatography.

Measurement conditions of ion chromatography for measuring the surface chlorine content or the total chlorine content: a surface chlorine content and an internal chlorine content may include such conditions that the chlorine content is measured at a flow rate of 1 ml/min using Dionex AS17-C as a column and 5-40 mM KOH as an eluant. DXi-500 manufactured by Nippon Dionex K.K. can be used as an ion chromatography apparatus.

When titanium dioxide grains are used as the titanium compound, the specific surface area of the titanium dioxide grains is preferably 30 to 50 $m^2/g$.

The barium compound is not particularly limited, and for example, barium carbonate can be used.

When barium carbonate grains are used as the barium compound, the specific surface area of the barium carbonate grains is preferably 10 to 30 $m^2/g$.

The ratio of the barium compound to the titanium compound is not required to meet a stoichiometric composition as long as it is in a range ensuring that the effect of the invention of the present application is exhibited, but it is preferable that the ratio is defined so as to fall within a range of 0.980 to 1.020 in terms of a molar ratio (Ba/Ti).

It is preferable to use distilled water, ion-exchanged water, pure water, ultrapure water or the like as water.

In the mixing step, the slurry is made to contain chlorine as chlorine ions in a ratio of 230 to 1100 wt ppm based on the amount of the barium titanate-based powder to be synthesized.

For adjusting the amount of chlorine ions, it is preferable to add a compound serving as a chlorine source, and it is preferable to add ammonium chloride as the chlorine source.

When the surface chlorine content of titanium dioxide is measured as described above, it is preferable that the added amount of the compound serving as chlorine source is defined on the assumption that all surface chlorine of titanium dioxide is ionized in the slurry.

Other components may be added in addition to the titanium compound, the barium compound, water and the compound serving as a chlorine source.

As other components, compounds serving as a Sr source, a Ca source or a Zr source may be added.

When these compounds are added, a barium titanate-based powder of a Perovskite type compound represented by the general formula $ABO_3$ (the site A is Ba, the site B is Ti and O is oxygen) where the site A is substituted with Sr or Ca, and the site B is replaced with Zr is obtained.

A dispersant may be added as other components.

As the dispersant, a polycarboxylic acid type polymer dispersant, a polycarboxylic acid ammonia salt, a maleic anhydride-based comb type polymer or the like can be used.

For mixing in the mixing step, a known method such as a wet-mixing method using a ball mill can be employed.

The mixing order of the titanium compound, the barium compound, water, the compound serving as a chlorine source and other components is not particularly limited.

(2) Drying Step and Temporary Firing Step

The slurry obtained in the mixing step is dried in a dryer, and subsequently, the dried mixture is fired in a fired furnace to obtain a barium titanate-based powder.

Preferably, the drying step is carried out at 100 to 200° C. for 12 to 36 hours.

Preferably, the temporary firing step is carried out at 800 to 1100° C. for 1 to 5 hours. Preferably, firing is performed in the air.

The obtained barium titanate-based powder may be directly used as a raw material for a multilayer ceramic capacitor, or may be further subjected to a chlorine removing step to reduce the chlorine content.

(3) Chlorine Removing Step

In the chlorine removing step, chlorine deposited on the surface of the barium titanate-based powder obtained in the temporary firing step.

The method for removing chlorine is not particularly limited, but it is preferable to remove chlorine using an ion exchange resin. Mention is made of a method including using water-washing in addition to the method including using an ion exchange resin.

As the ion exchange resin, a known anion exchange resin to be used for removing chlorine ions can be used, and an anion ion exchange resin having an amino group and an imino group (e.g. DIAION (registered trademark) SA10A-OH model manufactured by Mitsubishi Chemical Corporation) can be used.

Figure 1:
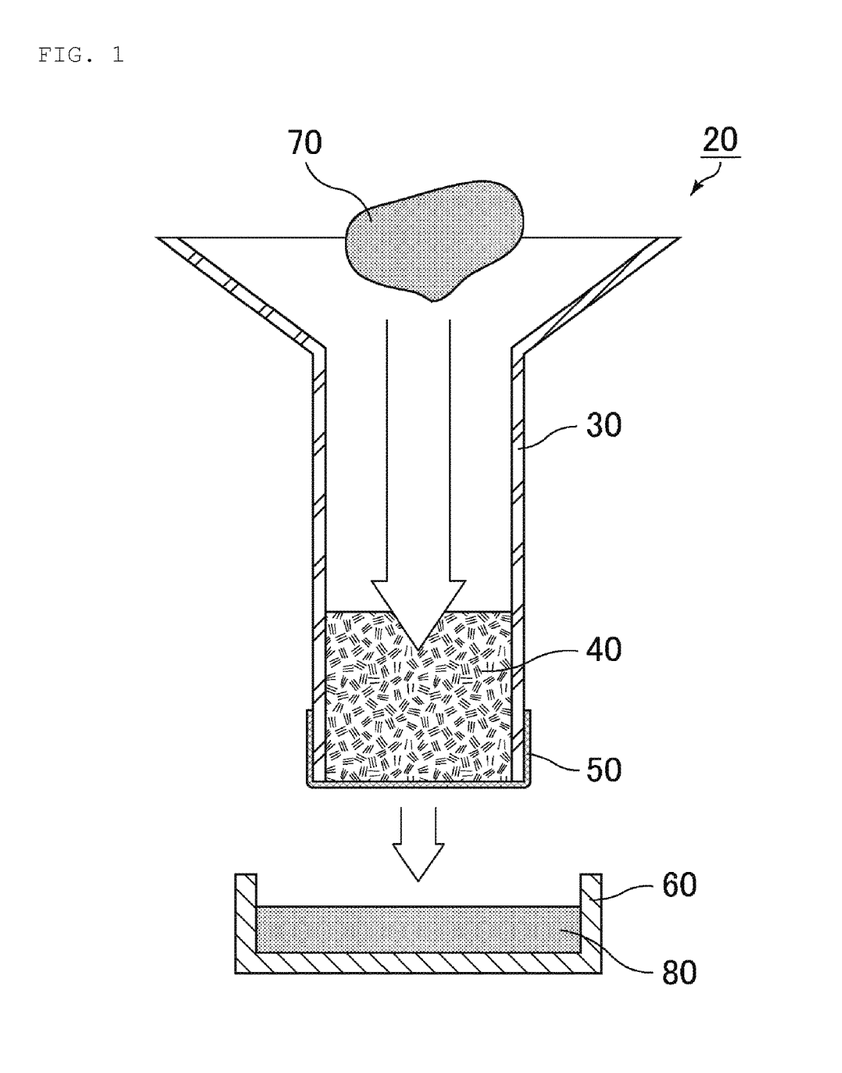
FIG. 1 is a view schematically showing one example of a chlorine removing step using an ion exchange resin.

FIG. 1 is a view schematically showing one example of a chlorine removing step using an ion exchange resin.

In the chlorine removing step using an ion exchange resin, a chlorine removing apparatus 20 can be used in which a plastic tube 30 is filled with an ion exchange resin 40, the tip of the tube 30 is covered with a filter cloth 50 as shown in FIG. 1.

In the chlorine removing step, the barium titanate-based powder is mixed with water (preferably pure water), and dispersed to prepare a slurry 70, and the slurry 70 is put in the chlorine removing apparatus 20. The slurry 70 is caused to pass through the ion exchange resin 40, and subjected to ion exchange to remove chlorine ions, and a slurry 80 after removal of chlorine is discharged from a filter cloth 50, and collected on a receptacle table 60.

Thereafter, the slurry is dried to obtain a barium titanate-based powder with the chlorine content reduced to 100 wt ppm or less.

The chlorine content of the barium titanate-based powder after the chlorine removing step can be measured by ion chromatography. The method for measuring the chlorine content can also be applied to the barium titanate-based powder before the chlorine removing step.

Subsequently, the multilayer ceramic capacitor according to the present invention will be described.

The barium titanate-based powder obtained by the method for producing a barium titanate-based powder according to the present invention is suitable as a raw material powder for a multilayer ceramic capacitor.

The multilayer ceramic capacitor according to the present invention is a multilayer ceramic capacitor produced using a barium titanate-based powder obtained by the method for producing a barium titanate-based powder according to the present invention.

Figure 2:
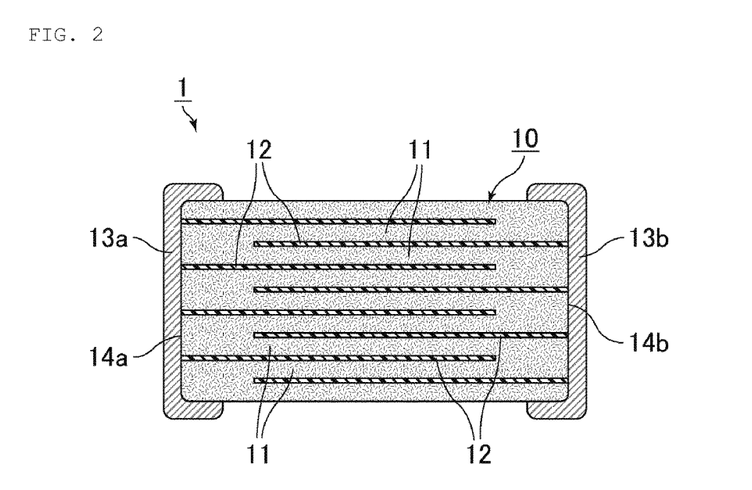
FIG. 2 is a sectional view schematically showing an example of a multilayer ceramic capacitor according to the present invention.

FIG. 2 is a sectional view schematically showing an example of a multilayer ceramic capacitor according to the present invention.

In a multilayer ceramic capacitor 1, a plurality of dielectric ceramic layers 11 and internal electrode layers 12 are laminated to form a laminated body 10.

The internal electrode layers 12 are alternately exposed to the surface of the laminated body 10 at both opposite end surfaces 14a and 14b of the laminated body 10.

At both end surfaces 14a and 14b of the laminated body 10, a pair of external electrodes 13a and 13b are formed so as to electrically connect the internal electrode layers 12.

In the multilayer ceramic capacitor 1, the dielectric ceramic layer 11 is a sintered body having a barium titanate-based grains as main phase grains, and is represented by the general formula $ABO_3$ (the site A is Ba, and may contain at least one selected from the group consisting of Sr and Ca in addition to Ba; the site B is Ti, and may contain at least one selected from the group consisting of Zr and Hf in addition to Ti; and O is oxygen).

The dielectric ceramic layer 11 is preferably a ceramic layer further containing other accessory components.

Accessory components that may be contained in the dielectric ceramic layer 11 include elements such as Mg, Dy, Si and Mn. The existence form of the accessory component is not limited, and for example, the accessory component may exist at crystal grains of barium titanate-based grains. Specifically, a grain including a core part composed of a barium titanate-based grain, and a shell part formed by solid solution of an element as an accessory component in the periphery of the barium titanate-based grain as a core part is preferable.

The accessory component may exist at a crystal grain boundary or a triple point in the form of an oxide etc.

The internal electrode layer 12 is preferably an electrode layer containing Ni, specifically an electrode layer containing metal nickel, an electrode layer containing a nickel alloy, or the like.

The external electrodes 13a and 13b are, for example, electrodes containing Ag or Cu as a main component.

Specifically, mention is made of an electrode including a thick film formed by baking a conductive paste containing copper; a nickel-plated film formed on the thick layer; and a tin-plated film formed on the nickel-plated film. An electrode having a known configuration can be used.

The multilayer ceramic capacitor 1 may be either a two-terminal type capacitor including two external electrodes 13a and 13b or a multi-terminal type capacitor including multiple external electrodes.

Hereinafter, one example of a method for producing the multilayer ceramic capacitor according to the present invention will be described.

First, a barium titanate-based powder obtained by the method for producing a barium titanate-based powder according to the present invention is provided.

Next, a compound as an accessory component is mixed with the barium titanate-based powder as necessary to obtain a ceramic raw material.

The form of the compound as an accessory component is not particularly limited, and various forms such as oxide powders, carbonate powders, chloride powders, sols and metal organic compounds can be used.

The mixing form of the compound as an accessory component is not particularly limited. For example, a plurality of accessory components may be mixed beforehand, or heat-treated and synthesized. A specific accessory component may be mixed in two stages.

As necessary, an organic binder, a plasticizer and an organic solvent are added to the ceramic raw material obtained in the manner described above, and the mixture is stirred using a ball mill etc. to prepare a ceramic slurry.

Thereafter, a ceramic green sheet is prepared using the ceramic slurry, a conductive paste film to form an internal electrode is formed, and the ceramic green sheet provided with the conductive paste film is laminated and fired to obtain a laminated body including a dielectric ceramic layer and a plurality of internal electrode layers.

Finally, an external electrode is formed at each of both end surfaces of the laminated body to produce a multilayer ceramic capacitor.

In each of these steps, a known technique and process conditions can be used.

Preferably, firing after laminating the ceramic green sheet is performed in a reducing atmosphere of a $H_2$—$N_2$—$H_2O$ gas with an oxygen partial pressure of $10^{-9}$ to $10^{-12}$ MPa at 1150 to 1250° C.

The method for forming the external electrode may also be a method in which a conductive paste layer to form an external electrode is applied and formed before firing of the ceramic green sheet, and the conductive paste layer is baked in synchronization with firing of the laminated body.

EXAMPLES

Hereinafter, examples disclosing a method for producing the multilayer ceramic capacitor according to the present invention more in detail will be shown. The present invention is not limited to these examples.

Examples 1 to 5 and Comparative Examples 1 to 3

A) Production of Barium Titanate-Based Powder

A $BaCO_3$ powder, and a $TiO_2$ powder having a specific surface area of 30 $m^2/g$ were provided, weighed to a molar ratio (Ba/Ti) of 1.0, and put in a 1 L vinyl chloride pot together with a medium (2 mmϕ) made of partially stabilized zirconia, a predetermined amount of pure water was added, and a special polycarboxylic acid type polymer surfactant as a dispersant was further added in a ratio of 3.2 wt % based on the total amount of $BaCO_3$ and $TiO_2$ powders.

Eight such samples were provided, and a predetermined amount of ammonium chloride ($NH_4Cl$) was added in each of the pots to obtain slurries adjusted so as to have chlorine contents of 40, 70, 230, 410, 600, 850, 1100 and 2000 wt ppm, respectively, based on the amount of barium titanate to be synthesized.

Table 1 shows the content of chlorine ions in the slurry in each of examples and comparative examples.

Each of these pots was placed on a pot stand, and rotated at 150 rpm for 72 hours to perform mixing. The obtained slurry was put in a dryer at 100° C., and dried.

Next, the dried mixture was put in a zirconia sagger, heated to a temperature of 950 to 1000° C. at a temperature rise rate of 5° C./minute in a firing furnace, held in the air for 1 hour, and temporarily fired to produce a barium titanate-based powder.

The surface chlorine content of the $TiO_2$ powder used was measured using ion chromatography, and found to be 35 ppm based on the amount of barium titanate to be synthesized. Therefore, in consideration of the surface chlorine content, ammonium chloride was added so as to obtain a predetermined chlorine ion content.

B) Evaluation of Specific Surface Area and Crystallinity

For the barium titanate-based powders obtained by performing temporary firing in Examples and comparative examples, the specific surface area was measured using a specific surface area measurement apparatus: Macsorb (registered trademark) manufactured by Mountech Co., Ltd. The integral breadth of a (222) plane diffraction peak was measured (X ray source: CuKα) using an X-ray diffractometer (X'Pert PRO MPD manufactured by PANalytical B.V.). The results are shown in Table 1. Table 1 shows the integral breadth under the condition of performing temporary firing at 1000 to 1060° C. (temporary firing temperature) to obtain a specific surface are of 3.3 $m^2/g$.

Figure 3:
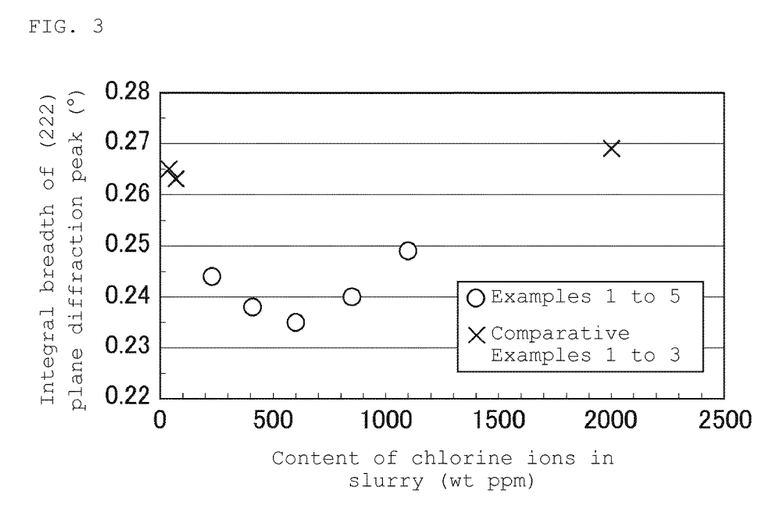
FIG. 3 is a graph showing a relationship between the content of chlorine ions in a slurry and the integral breadth of a (222) plane diffraction peak of a barium titanate-based powder.

FIG. 3 illustrates a relationship between the content of chlorine ions in a slurry and the integral breadth of a (222) plane diffraction peak of a barium titanate-based powder.

TABLE 1

| | Content of chlorine ions in slurry (wt ppm) | Integral breadth of (222) plane diffraction peak (°) |
|---|---|---|
| Comparative Example 1 | 40 | 0.265 |
| Comparative Example 2 | 70 | 0.263 |
| Example 1 | 230 | 0.244 |
| Example 2 | 410 | 0.238 |
| Example 3 | 600 | 0.235 |
| Example 4 | 850 | 0.240 |
| Example 5 | 1100 | 0.249 |
| Comparative Example 3 | 2000 | 0.269 |

In Comparative Examples 1 and 2, the content of chlorine ions in the slurry was as low as 40 or 70 wt ppm, so that the firing temperature was high, resulting in occurrence of coagulation, and the integral breadth was as large as 0.265° or 0.263°, so that crystallinity was reduced.

In Comparative Example 3, the content of chlorine ions in the slurry was as high as 2000 wt ppm, and thus the amount of chlorine as an impurity increased, so that crystallinity was rather reduced. Accordingly, the integral breadth was 0.269°.

On the other hand, in Examples 1 to 5, the content of chlorine ions in the slurry fell within a preferred range, and thus the integral breadth was as 0.25° or less, so that a barium titanate-based powder having high crystallinity was obtained.

This may be because during firing, $Ba^{2+}$ ions originating from the barium compound and chlorine ions existing in the slurry react with each other at around 900° C. to form $BaCl_2$, and the resulting compound acts as a reaction accelerator and a sintering additive in the form of a liquid phase, so that grain growth of $BaTiO_3$ is promoted to increase crystallinity.

Since a part of chlorine is eliminated as a gas during firing, the amount of chlorine contained in the barium titanate-based powder produced in each of Examples 1 to 5 is about 150 to 600 wt ppm.

C) Chlorine Removing Step

The barium titanate-based powder prepared in any one of Examples 1 to 5 and Comparative Examples 1 to 3 was put in a 1 L vinyl chloride pot together with a medium (2 mmφ) made of partially stabilized zirconia, a predetermined amount of pure water was added, and the pot was placed on a pot stand, and rotated at 150 rpm for 24 hours to perform mixing, thereby obtaining a slurry.

A chlorine removing apparatus 20 as shown in FIG. 1 was provided.

An ion exchange resin 40 (DIAION (registered trademark) SA10A-OH model manufactured by Mitsubishi Chemical Corporation) was packed at one end of a plastic tube 30 so as to have a thickness of 30 mm, further covered with a filter cloth 50, and fixed.

A slurry 70 was injected from the other end, and caused to pass through the ion exchange resin 40, and a slurry 80 passing therethrough was collected.

The collected slurry was put in a dryer at 100° C., and dried to obtain a barium titanate-based powder passing through the chlorine removing step.

In addition, the slurry was discharged from the pot without passing through the ion exchange resin, and dried in the same manner as described above to prepare a barium titanate-based powder.

D) Evaluation of Chlorine Content

The chlorine content of each of the barium titanate-based powder passing through the chlorine removing step and the barium titanate-based powder not passing through the chlorine removing step in each of examples and comparative examples was measured by an ion chromatography method. The measurement results are shown in Table 2.

TABLE 2

| | Content of chlorine ions in slurry (wt ppm) | Chlorine content of barium titanate-based powder not passing through chlorine removing step (wt ppm) | Chlorine content of barium titanate-based powder passing through chlorine removing step (wt ppm) |
|---|---|---|---|
| Comparative Example 1 | 40 | 30 | 11 |
| Comparative Example 2 | 70 | 58 | 13 |
| Example 1 | 230 | 154 | 8 |
| Example 2 | 410 | 310 | 9 |
| Example 3 | 600 | 500 | 10 |
| Example 4 | 850 | 530 | 12 |
| Example 5 | 1100 | 600 | 20 |
| Comparative Example 3 | 2000 | 1200 | 110 |

As described above, a part of chlorine is eliminated as a gas during firing, and therefore the amount of chlorine contained in the barium titanium-based powder produced in each of examples and comparative examples is smaller than the content of chlorine ions in the slurry as shown in the results of measurement of the amount of chlorine in the barium titanate-based powder not passing through the chlorine removing step.

By causing the slurry to pass through the ion exchange resin, the amount of chlorine contained in the barium titanate-based powder is reduced.

In Comparative Example 3, the amount of chlorine contained in the barium titanate-based powder not passing through the chlorine removing step is very large, and therefore the chlorine content is as high as more than 100 wt ppm even after the barium titanate-based powder passes through the chlorine removing step.

E) Production of Multilayer Ceramic Capacitor

A predetermined amount of each of MgO, $Dy_2O_3$, $SiO_2$, $MnCO_3$ and $BaCO_3$ as an additive was added to the barium titanate-based powder (passing or not passing through the chlorine removing step) produced in each of examples and comparative examples, the mixture was put in a vinyl chloride pot together with a polyvinyl butyral as an organic binder, ethanol as an organic solvent, and a medium (2 mmφ) made of partially stabilized zirconia, and the mixture was stirred, pulverized, and formed into a slurry.

The slurry was molded into a sheet using a doctor blade method in such a manner that the sheet thickness would be 0.8 μm after firing, and the sheet was cut to a predetermined size to obtain a rectangular green sheet.

Next, the green sheet was screen-printed with a conductive paste containing a nickel powder as a conductive component, thereby forming a conductive paste layer (internal electrode pattern) that would form an internal electrode layer after firing.

The green sheet provided with the internal electrode pattern was laminated, a green sheet which was not provided with an internal electrode pattern was laminated as an outer layer, and pressure bonding was performed to prepare a laminated block. An unfired laminated body obtained by cutting the laminated block to a predetermined size was heat-treated in the air (at 350° C. for 3 hours) to remove the binder, and then fired for 2 hours in a reducing atmosphere of a $H_2$—$N_2$—$H_2O$ gas with a pressure of $10^{-10}$ MPa at 1200° C. to obtain a fired laminated body (ceramic laminated body).

A conductive paste for formation of an external electrode was applied to both end surfaces of the fired laminated body, and baked, and Ni and Sn were electrolytic-plated to form external electrodes electrically connected to the internal electrode.

In this way, a multilayer ceramic capacitor as shown in FIG. 2 was prepared. The prepared multilayer ceramic capacitor has a size with a length (L) of 1.6 mm, a width (W) of 0.8 mm and a thickness (T) of 0.8 mm, the element thickness (thickness of the dielectric ceramic layer) is 1.5 μm, and the number of dielectric ceramic layers laminated is 320.

F) Evaluation of Reliability (1) Highly Accelerated Life Test (HALT)

For 100 multilayer ceramic capacitors produced in each of examples and comparative examples, a direct current voltage of 16 V was applied at an ambient temperature of 150° C. to conduct a HALT test.

At the time when the insulation resistance decreased to $10^5 \Omega$ or less, a sample was judged to fail, and Weibull analysis was performed to calculate a mean time to failure (MTTF). The results are shown in Table 3.

TABLE 3

| | Content of chlorine ions in slurry (wt ppm) | MTTF of sample using barium titanate-based powder not passing through chlorine removing step (hr) | MTTF of sample using barium titanate-based powder passing through chlorine removing step (hr) |
|---|---|---|---|
| Comparative Example 1 | 40 | 13 | 13 |
| Comparative Example 2 | 70 | 13 | 14 |
| Example 1 | 230 | 20 | 20 |
| Example 2 | 410 | 23 | 23 |
| Example 3 | 600 | 24 | 24 |
| Example 4 | 850 | 24 | 24 |
| Example 5 | 1100 | 21 | 21 |
| Comparative Example 3 | 2000 | 11 | 10 |

(2) Humidity Resistance Load Life Test

Next, similarly for 100 multilayer ceramic capacitors produced in each of examples and comparative examples, a direct current voltage of 37.5 V was applied at an ambient temperature of 85° C. and a relative humidity of 85% RH to conduct a humidity resistance load life test. A sample short-circuited after 1000 hours of test was judged to fail, and a failure rate was determined. The results are shown in Table 4.

TABLE 4

| | Content of chlorine ions in slurry (wt ppm) | Failure rate of sample using barium titanate-based powder not passing through chlorine removing step (hr) | Failure rate of sample using barium titanate-based powder passing through chlorine removing step (hr) |
|---|---|---|---|
| Comparative Example 1 | 40 | 0 | 0 |
| Comparative Example 2 | 70 | 0 | 0 |
| Example 1 | 230 | 1 | 0 |
| Example 2 | 410 | 1 | 0 |
| Example 3 | 600 | 1 | 0 |
| Example 4 | 850 | 1 | 0 |
| Example 5 | 1100 | 2 | 0 |
| Comparative Example 3 | 2000 | 2 | 1 |

From the results shown in Table 3, the multilayer ceramic capacitors of Examples 1 to 5 in which in the mixing step, the slurry contained chlorine ions in a ratio of 230 to 1100 wt ppm based on the amount of the barium titanate-based powder to be synthesized had a MTTF of 20 hours or more, so that satisfactory reliability was achieved.

The barium titanate-based powder produced in each of Examples 1 to 5 is a barium titanate-based powder in which the integral breadth of a (222) plane diffraction peak is 0.25° or less as shown in Table 1, namely a barium titanate-based powder having high crystallinity. In the case of a barium titanate-based powder having high crystallinity, grain growth in firing may be suppressed, resulting in suppression of coarsening of crystal grains.

The use of a barium titanate-based powder having high crystallinity is considered to lead to satisfactory reliability with the MTTF being 20 hours or more in the HALT test.

Further, as shown in Table 4, reliability in the humidity resistance load life test was also improved by carrying out the chlorine removing step to reduce the chlorine content to 100 wt ppm or less.

On the other hand, in Comparative Examples 1 and 2 where in the mixing step, the slurry contained 40 or 70 wt ppm of chlorine ions, the integral breadth of a (222) plane diffraction peak was 0.265° or 0.263°, i.e. more than 0.25°, so that only a barium titanate-based powder having low crystallinity was obtained. When such a barium titanate-based powder was used, grain growth occurred during firing, and thus reliability was deteriorated, so that the MTTF tended to decrease.

In Comparative Example 3 where in the mixing step, the slurry contained 2000 wt ppm of chlorine ions, the amount of chlorine as an impurity was excessively large, and chlorine was dissolved, so that the MTTF tended to decrease.

Further, the integral breadth of a (222) plane diffraction peak was 0.269°, i.e. more than 0.25°, so that only a barium titanate-based powder having low crystallinity was obtained. Further, even when the chlorine removing step was carried out, the chlorine content was not reduced to 100 wt ppm or less, and a failure occurred in the humidity resistance load life test.

What is claimed is:

1. A method for producing a barium titanate-based powder, the method comprising:
   mixing a titanium compound and a barium compound together with water and chlorine to prepare a first slurry, the chlorine being in the form of chlorine ions in a ratio of 230 to 1100 wt ppm based on an amount of the barium titanate-based powder to be produced;
   firing the mixture of the titanium compound and the barium compound contained in the first slurry to produce the barium titanate-based powder;
   dispersing the produced barium titanate-based powder in a second slurry; and
   removing chlorine contained in or on the barium titanate-based powder obtained after the firing of the mixture of the titanium compound and the barium compound contained in the first slurry and after dispersing the produced barium titanate-based powder in the second slurry.

2. The method for producing a barium titanate-based powder according to claim 1, wherein the chlorine is added as ammonium chloride to form the first slurry.

3. The method for producing a barium titanate-based powder according to claim 1, wherein the titanium compound is titanium dioxide.

4. The method for producing a barium titanate-based powder according to claim 3, wherein the titanium dioxide comprises grains having a specific surface area of 30 to 50 $m^2/g$.

5. The method for producing a barium titanate-based powder according to claim 1, wherein the barium compound is barium carbonate.

6. The method for producing a barium titanate-based powder according to claim 5, wherein the barium carbonate comprises grains having a specific surface area of 10 to 30 $m^2/g$.

7. The method for producing a barium titanate-based powder according to claim 1, further comprising drying the first slurry before the firing is carried out.

8. The method for producing a barium titanate-based powder according to claim 7, wherein the drying is carried out at 100 to 200° C. for 12 to 36 hours.

9. The method for producing a barium titanate-based powder according to claim 1, wherein the firing is carried out at 800 to 1100° C. for 1 to 5 hours.

10. The method for producing a barium titanate-based powder according to claim 1, wherein the chlorine contained in or on the barium titanate-based powder is removed until a content of the chlorine contained in or on the barium titanate-based powder is reduced to 100 wt ppm or less.

11. The method for producing a barium titanate-based powder according to claim 1, wherein the chlorine is removed by passing the second slurry in which the produced barium titanate-based powder is dispersed through an ion exchange resin.

12. The method for producing a barium titanate-based powder according to claim 1, wherein the chlorine is removed with the use of an ion exchange resin.

13. A multilayer ceramic capacitor which is produced using the barium titanate-based powder obtained by the method according to claim 1.

* * * * *